United States Patent
Liu et al.

(10) Patent No.: US 11,720,365 B2
(45) Date of Patent: Aug. 8, 2023

(54) PATH PREDICTION METHOD USED FOR INSTRUCTION CACHE, ACCESS CONTROL UNIT, AND INSTRUCTION PROCESSING APPARATUS

(71) Applicant: Alibaba Group Holding Limited, Grand Cafyman (KY)

(72) Inventors: Dongqi Liu, Hangzhou (CN); Tao Jiang, Hangzhou (CN); Chen Chen, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 90 days.

(21) Appl. No.: 17/017,047

(22) Filed: Sep. 10, 2020

(65) Prior Publication Data

US 2021/0089314 A1 Mar. 25, 2021

(30) Foreign Application Priority Data

Sep. 25, 2019 (CN) .......................... 201910912797.5

(51) Int. Cl.
*G06F 9/38* (2018.01)
*G06F 12/0875* (2016.01)
*G06F 12/0864* (2016.01)

(52) U.S. Cl.
CPC ........ *G06F 9/3806* (2013.01); *G06F 12/0864* (2013.01); *G06F 12/0875* (2013.01); *G06F 2212/452* (2013.01); *Y02D 10/00* (2018.01)

(58) Field of Classification Search
None
See application file for complete search history.

(56) References Cited

U.S. PATENT DOCUMENTS 5,283,873 A * 2/1994 Steely, Jr. ............. G06F 9/3806
712/240
5,752,259 A * 5/1998 Tran ...................... G06F 9/3814
711/E12.047

(Continued)

FOREIGN PATENT DOCUMENTS

CN          104903851 A  *  9/2015   ......... G06F 12/0864
WO    WO-2019197797 A1 * 10/2019   ......... G06F 12/0862

OTHER PUBLICATIONS

Machine Translation of CN 104854557 A, published Aug. 19, 2015. (Year: 2015).*

(Continued)

*Primary Examiner* — Steven G Snyder

(57) ABSTRACT

An instruction processing apparatus is disclosed and includes: an instruction cache, which maps data blocks in a memory based on a multi-way set-associative structure and includes a plurality of cache lines; and an access control unit, coupled between an instruction fetch unit and the instruction cache, and adapted to read the plurality of cache lines respectively by using a plurality of data channels, and select a hit cache line from the plurality of cache lines by using a plurality of selection channels, to obtain an instruction, where the access control unit includes a path prediction unit, where the path prediction unit obtains, based on a type of the instruction, path prediction information corresponding to an instruction address, and enables at least one data channel and/or at least one selection channel based on the path prediction information. The instruction processing apparatus selectively enables an access channel of the instruction cache based on the path prediction information by using the access control unit, to reduce dynamic power (Continued)

consumption in access. A corresponding path prediction method, a computer system, and a system-on-chip are also disclosed.

20 Claims, 9 Drawing Sheets

(56) References Cited

U.S. PATENT DOCUMENTS

| | | | | |
|---|---|---|---|---|
| 6,418,525 | B1* | 7/2002 | Charney | G06F 9/3806 |
| | | | | 711/204 |
| 8,892,924 | B2* | 11/2014 | Balasubramanian | ......................... |
| | | | | G06F 1/3293 |
| | | | | 713/323 |
| 8,892,929 | B2* | 11/2014 | Balasubramanian | ......................... |
| | | | | G06F 1/3206 |
| | | | | 713/323 |
| 2010/0064123 | A1 | 3/2010 | Zuraski, Jr. et al. | |
| 2016/0217016 | A1* | 7/2016 | Raman | G06F 9/4806 |
| 2017/0083337 | A1 | 3/2017 | Burger | |
| 2019/0163902 | A1 | 5/2019 | Reid et al. | |

OTHER PUBLICATIONS

'Next Cache Line and Set Prediction' by Brad Calder and Dirk Grunwald, copyright 1995 by ACM. (Year: 1995).*

\* cited by examiner

PATH PREDICTION METHOD USED FOR INSTRUCTION CACHE, ACCESS CONTROL UNIT, AND INSTRUCTION PROCESSING APPARATUS

CROSS-REFERENCE TO RELATED APPLICATIONS

This application claims priority to Chinese Patent Application No. 201910912797.5 filed Sep. 25, 2019, which is incorporated herein in its entirety.

TECHNICAL FIELD

The present invention relates to the processor field, and more specifically, to a path prediction method used for an instruction cache, an access control unit, and an instruction processing apparatus.

BACKGROUND OF THE INVENTION

A high-performance processor includes a multi-level storage structure, including registers, multi-level caches, a memory accessed by using a storage bus, and an external storage apparatus accessed by using an input/output I/O bus. A level 1 cache (L1) includes, for example, an instruction cache and a data cache that are respectively configured to store an instruction and data obtained by the processor when the processor initially accesses the memory. In subsequent access, the processor searches for the instruction and data in the cache. This can reduce a quantity of times that the memory is accessed. Use of the cache can further reduce a speed difference between the processor and the memory, thereby improving system performance.

A plurality of mapping rules are used when data blocks in the memory are moved to the cache. For example, a set-associative mapping cache includes S cache sets, and each set includes E cache lines, that is, an E-way set-associative structure is formed, where S is any natural number, and a value of E is a natural number such as 2, 4, or 8. When data is moved, data blocks in the memory are stored in any line in only one set.

In a cache access control method, when a processor accesses a multi-way set-associative mapping cache, the processor accesses a plurality of cache lines in parallel to obtain content of the plurality of cache lines, makes address comparison, and selects a hit cache line. However, in the parallel access method, a plurality of cache lines need to be read, and a plurality of addresses need to be compared. This not only causes a latency in cache access, but also generates high dynamic power consumption.

In a further improved cache access control method, a processor performs branch prediction by using a branch target buffer (Branch Target Buffer, BTB for short). In addition, in an entry of the BTB, prediction information includes sequential path prediction information and jump path prediction information. A path selection signal is generated based on the prediction information. Therefore, when the processor accesses a cache, if an instruction type is a branch instruction, a single cache line may be enabled, to reduce dynamic power consumption. However, in the cache access control method, path prediction can be performed only for a branch instruction, and cannot be performed for a non-branch instruction. Therefore, when the processor accesses the cache by executing the non-branch instruction, the processor still needs to access content of a plurality of cache lines in parallel. In addition, in the cache access control method, a jump branch instruction and a non-jump branch instruction both need to be stored in an entry of the BTB. This may cause a conflict probability of the BTB to increase.

Therefore, in the cache access control method for the processor, it is expected that a new mechanism should be introduced, so that dynamic power consumption can be reduced when the processor executes different types of instructions.

SUMMARY OF THE INVENTION

In view of this, the present disclosure provides a path prediction method used for a set-associative instruction cache, a access control unit, and an instruction processing apparatus. In an access control unit, jump path prediction or sequential path prediction is performed based on a type of an instruction to generate a path selection signal. Therefore, when different types of instructions are executed, a single cache line in a cache can be accessed, and dynamic power consumption in cache access can be reduced.

According to a first aspect of the present disclosure, an instruction processing apparatus is provided and includes: an instruction fetch unit, adapted to obtain an instruction based on an instruction address of a program counter; an execution unit, coupled to the instruction fetch unit, and adapted to execute the instruction; an instruction cache, adapted to store instruction content accessed by using the instruction address, where the instruction cache maps data blocks in a memory based on a multi-way set-associative structure and includes a plurality of cache lines; and an access control unit, coupled between the instruction fetch unit and the instruction cache, and adapted to read the plurality of cache lines respectively by using a plurality of data channels, and select a cache line from the plurality of cache lines by using a plurality of selection channels, to obtain the instruction, where the access control unit includes a path prediction unit, where the path prediction unit obtains, based on a type of the instruction, path prediction information corresponding to the instruction address, and enables at least one data channel and/or at least one selection channel based on the path prediction information.

According to a second aspect of the present disclosure, a path prediction method used for an instruction cache is provided, where the instruction cache is adapted to store instruction content accessed by using an instruction address and map data blocks in a memory based on a multi-way set-associative structure and includes a plurality of cache lines, and the path prediction method includes: obtaining an instruction based on an instruction address of a program counter; obtaining, based on a type of the instruction, path prediction information corresponding to the instruction address; enabling at least one data channel in a plurality of data channels and/or at least one selection channel in a plurality of selection channels based on the path prediction information; and selecting, from the plurality of cache lines by using the instruction address as an index, a cache line corresponding to the instruction address, to obtain the instruction.

According to a third aspect of the present disclosure, a computer system is provided and includes the foregoing instruction processing apparatus.

According to a fourth aspect of the present disclosure, a system-on-chip is provided and includes the foregoing instruction processing apparatus.

The instruction processing apparatus according to the embodiments of the present disclosure uses a set-associative mapping instruction cache, uses the path prediction unit to obtain, based on the type of the instruction, the path prediction information corresponding to the instruction address, and enables at least one data channel and/or at least one selection channel based on the path prediction information. In comparison with an instruction processing apparatus in the prior art, not only path prediction of a jump instruction can be implemented, but also path prediction of a non-jump instruction can be implemented. When various types of instructions access the instruction cache, only a part of access channels (data channels and/or selection channels) of the instruction cache are enabled based on the path prediction information. Therefore, when the instruction cache is accessed, dynamic power consumption in cache access can be reduced.

In the instruction processing apparatus according to a preferred embodiment, the path prediction unit accesses a branch target buffer to obtain path prediction information when a jump instruction is obtained, but does not need to access the branch instruction buffer to obtain path prediction information when a non-jump branch instruction is obtained. This can reduce a conflict probability of the branch instruction buffer.

In the instruction processing apparatus according to a preferred embodiment, the path prediction unit temporarily stores a branch instruction address, a target address, and path hit information of a jump instruction, and when learning that a next jump instruction does not hit the branch instruction buffer, uses temporarily stored information during an instruction stream NOP to update the branch instruction buffer, to reduce a latency caused to execution of an instruction stream by path maintenance.

BRIEF DESCRIPTION OF THE DRAWINGS

The embodiments of the present invention are described with reference to the accompanying drawings hereinafter, and the description will make the above and other objectives, features, and advantages of the present invention clearer. In the drawings.

DETAILED DESCRIPTION OF THE INVENTION

Figure 1:
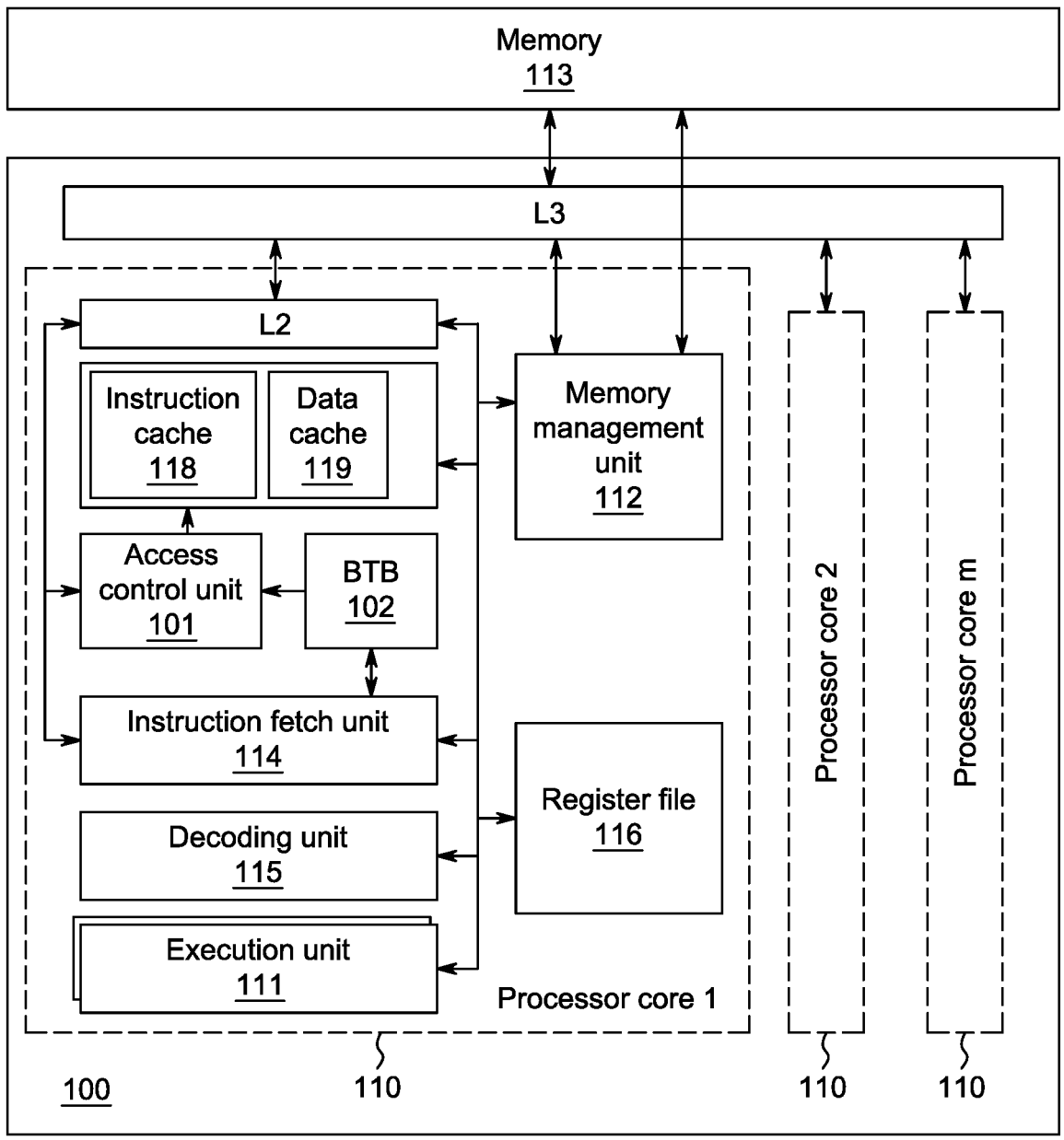
FIG. 1 illustrates a schematic block diagram of an instruction processing apparatus according to an embodiment of the present invention.

The following describes the present invention based on the embodiments, but the present invention is not limited to the embodiments. In the following detailed description of the present invention, some specific details are described exhaustively. Those skilled in the art can fully understand the present invention without descriptions of the detailed parts. To avoid confusion of the essence of the present invention, well-known methods, processes, and procedures are not described in detail. In addition, the figures are not necessarily drawn in proportion.

The following terms are used in this specification.

Instruction packet: It is a binary segment of a fixed length, obtained by a processor from an instruction cache or an external bus and processed in an instruction fetch period.

Instruction element fields: They are fields extracted from an instruction packet based on a greatest common divisor of various instruction code lengths. For example, if an instruction packet includes two instruction codes, and instruction code lengths are 8 bits and 16 bits respectively, instruction element fields are extracted from the instruction packet based on 8 bits.

Instruction pipeline: An instruction pipeline is a manner of dividing an operation of an instruction into a plurality of detailed steps, so that each step is completed by a dedicated circuit, to improve instruction execution efficiency of the processor. Currently, mainstream instruction pipeline techniques include three-stage, four-stage, five-stage, seven-stage, and super-stage instruction pipelines, and the like. For example, a five-stage instruction pipeline illustrated in textbooks includes an instruction fetch stage, a decoding stage, an execution stage, a memory access stage, and a write-back stage. In this specification, the instruction fetch stage, the decoding stage, the execution stage, the memory access stage, and the write-back stage are also referred to as an instruction fetch unit, a decoding unit, an execution unit, a memory access unit, and a retirement unit herein, respectively. A combination of software and hardware for implementing the instruction pipeline is referred to as a pipeline structure.

NOP: In some cases, no instruction can be executed in a stage of the instruction pipeline. This is referred to as a NOP in the pipeline.

Program counter, PC for short: It is a register used to store an instruction address of a next instruction. The processor obtains the instruction from a memory or cache based on the instruction address of the program counter, and executes the instruction.

Instruction cache: t is a level 1 cache used to store an instruction. The processor accesses the instruction cache by using an instruction address, to obtain instruction content. In this way, a quantity of searches for instruction content in the memory and time consumption can be reduced.

Branch target buffer, BTB for short: It is a small cache used to store a branch instruction address, a target address, and target prediction statistics information in an entry in a mapping table. The processor performs branch prediction by using the branch target buffer, to reduce NOPs. In this way, efficiency of the instruction pipeline can be improved.

Translation look-aside buffer, TLB for short: It is a small cache used to store a virtual address and a physical page address in an entry in a mapping table, and used for interaction between a virtual address and a physical address. The processor searches for a matched entry based on a virtual address index, thereby translating a virtual address into a physical address. In this way, a quantity of searches for a physical address in the memory and time consumption can be reduced.

In addition, in this application, the BTB is also used for branch prediction and path prediction. During path prediction, a jump branch instruction and a non-jump branch instruction are differentiated. The former is referred to as a jump instruction. The latter is referred to as a non-jump instruction.

FIG. 1 illustrates a schematic block diagram of an instruction processing apparatus according to an embodiment of the present invention.

The instruction processing apparatus 100 includes one or more processor cores 110 configured to process instructions. An application program and/or a system platform may control the plurality of processor cores 110 to process and execute instructions.

Each processor core 110 may be configured to process a specific instruction set. In some embodiments, an instruction set may support complex instruction set computing (Complex Instruction Set Computing. CISC), reduced instruction set computing (Reduced Instruction Set Computing, RISC), or very long instruction word (Very Long Instruction Word, VLIW)-based computing. Different processor cores 110 may process different instruction sets or a same instruction set. In some embodiments, the processor core 110 may further include other processing modules, for example, a digital signal processor (Digital Signal Processor, DSP).

The instruction processing apparatus 100 may further include a multi-level storage structure, for example, a register file 116, multi-level caches L1 through L3, and a memory 113 accessed by using a storage bus.

The register file 116 may include a plurality of registers configured to store different types of data and/or instructions. The registers may be of different types. For example, the register file 116 may include an integer register, a floating-point register, a status register, an instruction register, and a pointer register. The registers in the register file 116 may be implemented by using general registers, or may be particularly designed based on an actual requirement of the instruction processing apparatus 100.

All or apart of the caches L1 through L3 may be integrated in each processor core 110. For example, the level 1 cache L1 is located in each processor core 110, and includes an instruction cache 118 configured to store an instruction and a data cache 119 configured to store data. Based on different architectures, at least one cache on a level (for example, the level 3 cache L3 shown in FIG. 1) may be located outside the plurality of processor cores 110 and shared by the plurality of processor cores. The instruction processing apparatus 100 may further include an external cache.

The instruction processing apparatus 100 may include a memory management unit (Memory Management Unit, MMU) 112 for translating a virtual address into a physical address, and accessing the memory based on the physical address to obtain an instruction and data. A translation look-aside buffer TLB may be disposed in the cache to temporarily store a mapping table of virtual addresses and page physical addresses, and used for interaction between a virtual address and a physical address. A processor searches for a matched entry based on a virtual address index, thereby translating a virtual address into a physical address. In this way, a quantity of searches for a physical address in the memory and time consumption can be reduced. The memory management unit 112 may also obtain, from the memory, a mapping relationship that is not temporarily stored. One or more memory management units 112 may be disposed in each processor core 110. Memory management units 112 in different processor cores 110 may also implement synchronization with memory management units 112 located in other processors or processor cores, so that each processor or processor core can share a unified virtual storage system.

The instruction processing apparatus 100 is configured to execute an instruction sequence (that is, an application program). A process of executing each instruction by the instruction processing apparatus 100 includes steps of fetching an instruction from a memory that stores the instruction, decoding the fetched instruction, executing the decoded instruction, saving an instruction execution result, and the like. This cycle is repeated until all instructions in an instruction set are executed or a stop instruction is encountered.

To implement the foregoing process, the instruction processing apparatus 100 may include an instruction fetch unit 114, a decoding unit 15, an instruction transmission unit (not shown), an execution unit 111, an instruction retirement unit (not shown), and the like.

The instruction fetch unit 114, as a start engine of the instruction processing apparatus 100, is configured to move an instruction from the instruction cache 118 or the memory 113 to an instruction register (for example, a register for storing an instruction, in the register file 116), and receive a next instruction fetch address or obtain a next instruction fetch address through calculation based on an instruction fetch algorithm, where the instruction fetch algorithm includes, for example, increasing or decreasing addresses based on a length of an instruction.

After fetching the instruction, the instruction processing apparatus 100 enters an instruction decoding stage. The decoding unit 115 interprets and decodes the fetched instruction based on a predetermined instruction format to identify and differentiate different instruction types and operand obtaining information (the operand obtaining information may point to an immediate or a register configured to store an operand), to prepare for an operation of the execution unit 111.

The instruction transmission unit generally exists in the high-performance instruction processing apparatus 100, and is located between the decoding unit 115 and the instruction execution unit, and configured to schedule and control an instruction, to allocate each instruction to different execution units 111 efficiently, so that parallel operations of a plurality of instructions become possible. After the instruction is fetched, decoded, and scheduled to a corresponding execution unit 111, the corresponding execution unit 111 starts to execute the instruction, that is, perform an operation indicated by the instruction, and implement a corresponding function.

The instruction retirement unit is mainly responsible for writing back an execution result generated by the execution unit 111 to a corresponding storage location (for example, an internal register of the instruction processing apparatus 100), so that the corresponding execution result can be quickly obtained from the storage location by using a subsequent instruction.

For different types of instructions, different execution units 111 may be correspondingly disposed in the instruction processing apparatus 100. The execution unit 111 may be an operation unit (for example, including an arithmetic logic unit or a vector operation unit, and configured to perform an operation based on an operand and output an operation result), a memory execution unit (for example, configured to access the memory based on an instruction to read data in the memory or write specified data to the memory), a coprocessor, or the like. In the instruction processing apparatus 100, each execution unit 111 may run in parallel and output a corresponding execution result.

In this embodiment, the instruction processing apparatus 100 may be a multi-core processor, including the plurality of processor cores 110 that share the level 3 cache L3. In an alternative embodiment, the instruction processing apparatus 100 may be a single-core processor, or a logic component configured to process an instruction in an electronic system. The present invention is not limited to any specific type of processor.

The instruction processing apparatus 100 according to this embodiment further includes an access control unit 101 and a BTB (branch target buffer) 102. The access control unit 101 is coupled to the instruction cache 118 and the BTB 102, and also has a search function for obtaining instruction content from the instruction cache 118 and a path selection function for performing path prediction based on an instruction address to control an internal channel of the instruction cache 118.

For example, the instruction cache 118 is a set-associative mapping cache, including S cache sets, where each set includes E cache lines, that is, an E-way set-associative structure is formed, where S is any natural number, and a value of E is a natural number such as 2, 4, or 8. When data is moved from the memory 113 to the instruction cache 118, data blocks in the memory 113 are stored in any line in only one set.

When the instruction fetch unit 114 obtains an instruction from the instruction cache 118, the access control unit 101 uses an index i and a tag t in an instruction address as a set index and a path index to search the instruction cache 118 for a cache line corresponding to the instruction address, and then obtains corresponding instruction content from the cache line by using a block offset o in the instruction address, thereby implementing an instruction content search function.

In the instruction processing apparatus 100 according to this embodiment, the BTB 102 is not only used for branch prediction, but also used for jump path prediction. Each entry in the BTB 102 not only includes a branch instruction address, a target address, and target prediction statistics information, but also includes extended path prediction information of the target address.

Further, the access control unit 101 performs jump path prediction by using the instruction address, and performs a search based on a pre-decoded instruction type to obtain path prediction information of the target address, to generate a path selection signal. Therefore, when the target address of the instruction cache 118 is accessed, only a single cache line is enabled, and dynamic power consumption in cache access is reduced.

A branch prediction method for an instruction processing apparatus 100 according to an embodiment of the present invention is further described with reference to FIG. 2 and FIG. 3.

The instruction processing apparatus 100 is configured to execute an instruction sequence of an application program, including instructions A to F, where instructions A and D to F are non-jump instructions, and instructions B and C are jump instructions. A target address of the jump instruction B is the instruction F. A target address of the jump instruction C is the instruction E.

A process of executing each instruction by the instruction processing apparatus 100 includes steps of fetching an instruction from a memory that stores the instruction, decoding the fetched instruction, executing the decoded instruction, saving an instruction execution result, and the like. This cycle is repeated until all instructions in an instruction set are executed or a stop instruction is encountered.

Figure 3:
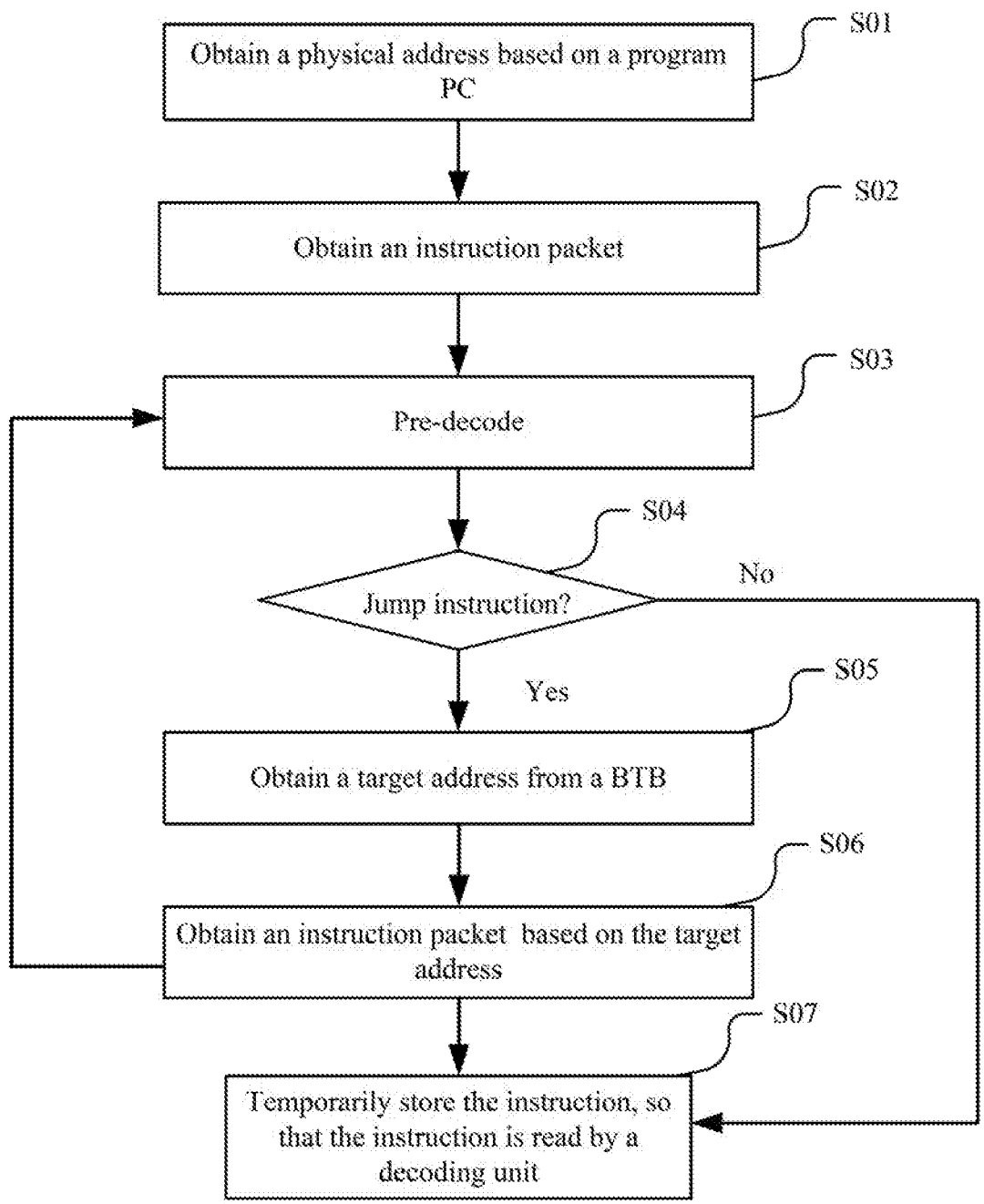
FIG. 3 illustrates a flowchart of a branch prediction method according to an embodiment of the present invention.

As shown in FIG. 3, an instruction fetch unit 114 performs the following steps.

In step S01, a physical address is obtained from a cache or memory based on a program counter PC.

In step S02, an instruction packet is obtained from an instruction cache 118 by using the physical address.

In step S03, the obtained instruction packet is pre-decoded.

In step S04, whether a current instruction is a jump instruction is determined based on a pre-decoding result. If the current instruction is a jump instruction, steps S05 to S07 are performed. If the current instruction is not a jump instruction, step S07 is directly performed.

In step S05, a search is performed in a BTB 102 based on an instruction address, to obtain a target address.

In step S06, an instruction packet of the target address is obtained.

In step S07, the instruction is temporarily stored, so that the instruction is read by a decoding unit.

For the search in the BTB 102, there are the following possibilities.

First possibility: The BTB 102 is hit. In this case, the instruction fetch unit 114 obtains the instruction packet from the instruction cache 118 based on the target address found in the BTB 102, and then performs the steps of pre-decoding the instruction packet, determining whether there is a jump instruction, searching the BTB 102 based on the jump instruction, and temporarily storing the jump instruction.

Second possibility: The BTB 102 is not hit. In this case, the instruction fetch unit 114 does not perform any prediction for the instruction. The instruction is sent to a decoding unit 115 and an instruction transmission unit to an execution unit. The execution unit executes the instruction, and stores the target address of the instruction as a new entry in the BTB 102 based on an actual execution result.

According to this embodiment, pre-decoding is performed to identify the jump instruction, and further, the target address of the jump instruction is obtained based on the BTB, and the instruction packet of the target address is obtained. Therefore, a possibility of subsequently adding a NOP to an instruction pipeline can be avoided or reduced.

Figure 4:
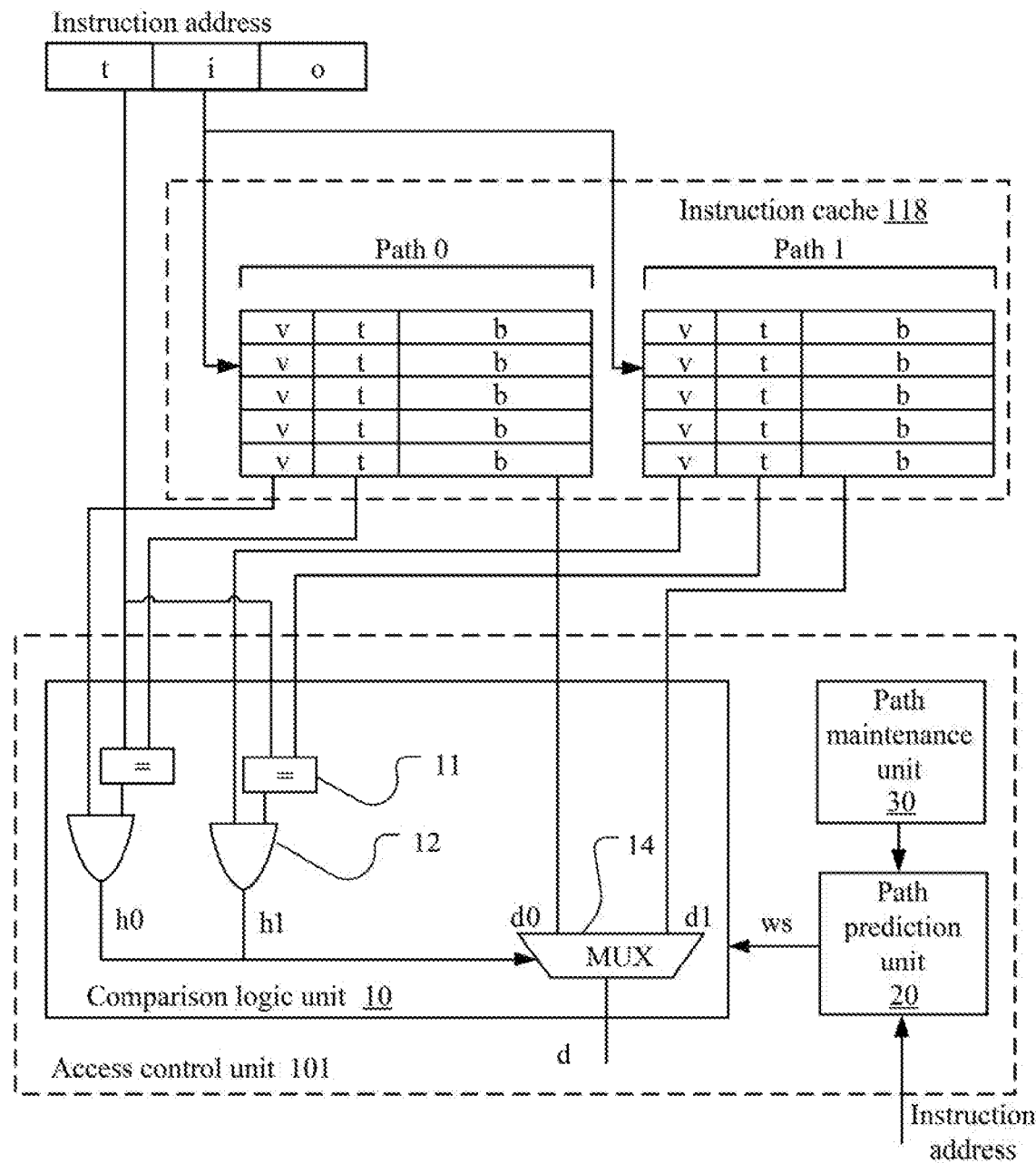
FIG. 4 illustrates a schematic block diagram of an instruction cache system according to an embodiment of the present invention.

FIG. 4 illustrates a schematic block diagram of an instruction cache system according to an embodiment of the present invention. The instruction cache system includes an instruction cache 118 and an access control unit 101. The access control unit 101 is configured to obtain a corresponding instruction from the instruction cache 118 based on an instruction address of a program counter PC, perform at least one of sequential path prediction and jump path prediction based on a type of the instruction, then use prediction information to control enabling of next access to the instruction cache, and enable access to only a data channel after path prediction, thereby reducing dynamic power consumption in instruction cache access.

The instruction address of the program counter PC includes a tag t, a set index i, and a block offset o. However, the present invention is not limited thereto. When accessing the instruction cache based on the instruction address, the access control unit 101 may search the instruction cache for a corresponding cache line based on the tag t and the set index i of the instruction address.

For example, the instruction cache 118 is located in a level 1 cache L1 of an instruction processing apparatus 100. The instruction cache 118 is a cache having a set-associative structure, including S cache sets, where each set includes E cache lines, and each cache line includes a B-byte cache block, that is, an E-way set-associative structure is formed, where S and E are any natural numbers, and a value of E is a natural number such as 2, 4, or 8. In this embodiment, the instruction cache includes 256 sets, each set includes 2 cache lines, and each cache line includes a 32 KB cache block, that is, an instruction cache having a 2-way set-associative structure is formed.

In this embodiment, all cache lines in the instruction cache 118 have a same structure, including three parts of content: a valid bit v, a tag t, and a cache block b. However, the present invention is not limited thereto.

The access control unit 101 includes a comparison logic unit 10, a path prediction unit 20, and a path maintenance unit 30. The comparison logic unit 10 obtains corresponding instruction content from the instruction cache 118. The path prediction unit 20 selects a path based on a type of an instruction to reduce dynamic power consumption in cache access. The path maintenance unit 30 maintains prediction information in the path prediction unit 20. The maintenance includes adding new path prediction information to the path prediction unit 20 or updating existing path prediction information in the path prediction unit 20 based on hit information of a target address of a jump instruction.

The comparison logic unit 10 includes a plurality of comparison logics and a plurality of data channels corresponding to the multi-way set-associative structure of the instruction cache 118. A corresponding cache set is selected from the instruction cache 118 based on a set index in an instruction address. The plurality of comparison logics of the comparison logic unit 10 respectively include a comparator 11 and an AND gate 12. The comparator 11 is configured to compare a tag in the instruction address with a tag in a cache line, and therefore can match a cache line corresponding to the tag and the set index in the instruction address. The AND gate 12 is configured to further determine whether the cache line is valid. In this way, a plurality of pieces of path hit information h0 and h1 are generated. The plurality of data channels of the comparison logic unit 10 include a multi-path selector 14 for selecting, based on the plurality of path hit signals h0 and h1, data d in the hit cache line from a plurality of pieces of data do and d1 obtained from a plurality of cache lines.

When the access control unit 101 receives an access request, the comparison logic unit 10 searches the instruction cache 118 for cache line data corresponding to the instruction address, thereby obtaining instruction data corresponding to the instruction address. If the plurality of comparison logics of the comparison logic unit 10 determine that a tag read in a path i is equal to the tag in the instruction address, it indicates that the path i is hit, and data read in the path i in the plurality of data channels is sent to an instruction fetch unit 114 of the instruction processing apparatus 100 by using the multi-path selector. If no comparison result is "equal", it indicates no hit, and the instruction fetch unit 114 of the instruction processing apparatus needs to access a memory.

The path prediction unit 20 in the access control unit 101 performs at least one of sequential path prediction and jump path prediction based on the type of the instruction, and generates a path selection signal ws based on prediction information of the target address. Further, the comparison logic unit 10 may select a single channel based on the path selection signal ws to obtain instruction content corresponding to the target address.

In the instruction cache system according to the foregoing embodiment, the path prediction unit 20 provides the path selection signal, so that the comparison logic unit 10 does not need to read data of all channels in parallel, but selects to read, from a single channel, the instruction content corresponding to the target address. Therefore, read operations performed by the comparison logic unit 10 on the instruction cache 118 can be reduced, and dynamic power consumption in cache access is effectively reduced.

Figure 5:
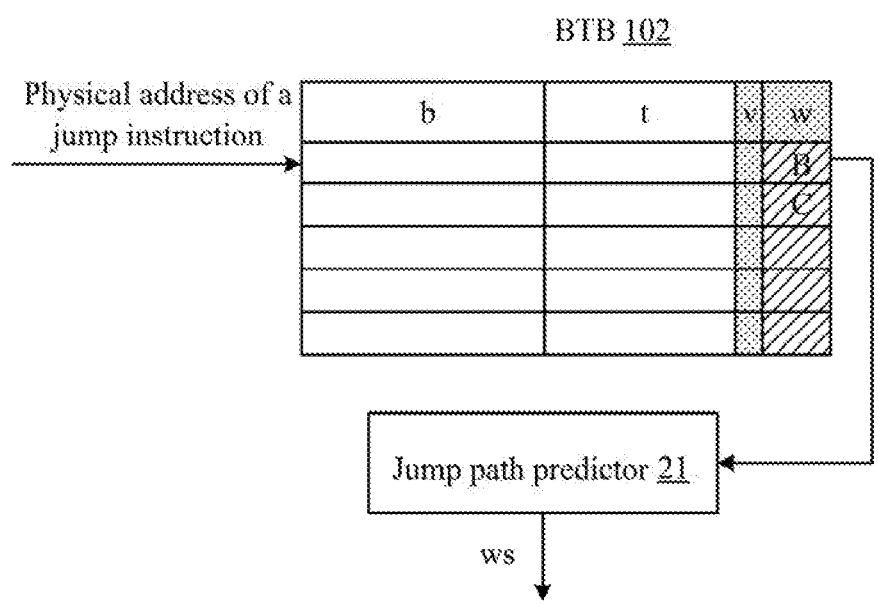
FIG. 5 illustrates a schematic block diagram of a jump path predictor according to an embodiment of the present invention.

FIG. 5 illustrates a schematic block diagram of a jump path predictor according to an embodiment of the present invention. A jump path predictor 21 may be directly used as the path prediction unit 20 shown in FIG. 4, or used as an internal unit of the path prediction unit 20, or may be used as an internal unit of a BTB 102.

Figure 2:
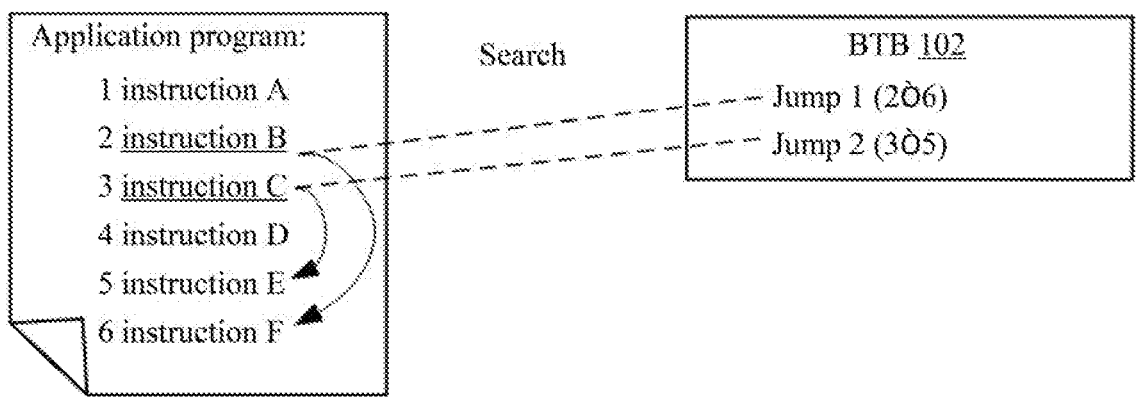
FIG. 2 illustrates a schematic diagram in which an instruction processing apparatus executes an instruction by using a branch prediction method according to an embodiment of the present invention.

The BTB 102 according to this embodiment is not only used in the branch prediction method shown in FIG. 2 and FIG. 3, but also used in a jump path prediction method shown in FIG. 5. Therefore, each entry in the BTB 102 not only includes a branch instruction address b, a target address t, and target prediction statistics information v, but also includes extended path prediction information w and a flag bit. The path prediction information is, for example, a path sequence number of a set-associative instruction cache. For example, for a 2-way set-associative instruction cache 118, a 1-bit binary number is used as path prediction information, where numeric values 0 and 1 respectively indicate a cache line 0 and a cache line 1. The flag bit indicates whether corresponding path prediction information w is valid. For example, a 1-bit binary number may be used as a flag bit.

A jump path predictor 21 in an access control unit 101 is coupled to the BTB 102, searches the BTB 102 based on an instruction address in an instruction fetch unit 114 to obtain the path prediction information w, and generates a path selection signal ws corresponding to the path prediction information w. After it is found that a jump instruction exists in an instruction packet during pre-decoding, a comparison logic unit 10 in the access control unit 101 enables only a single channel based on the path selection signal ws in jump path prediction. Therefore, 1/N dynamic power consumption is generated, where N indicates a quantity of cache lines in the instruction cache 118.

In this embodiment, the instruction cache 118 has a 2-way set-associative structure, and an instruction B in an application program is a jump instruction. When jump path prediction is used, the jump path predictor 21 learns that the path prediction information in the BTB 102 is the cache line 0. Further, the access control unit 101 accesses the instruction cache 118 based on an instruction fetch operation of the instruction B, and enables only a comparison logic and a data channel of the cache line 0. Therefore, only ½ dynamic power consumption is generated.

In this embodiment, after it is learned during pre-decoding that an instruction type is a jump instruction, the jump path predictor 21 uses the instruction address to search for the path prediction information in the BTB 102 to control access to a single channel of the instruction cache 118, to implement the jump path prediction method. In the jump path prediction method, the BTB 102 needs to be accessed only for a jump instruction, and the BTB 102 does not need to be accessed for a non-jump instruction. Therefore, a quantity of times that the BTB 102 is accessed is reduced, and this helps to reduce a conflict probability of the BTB 102.

In an alternative embodiment, the jump path predictor 21 may obtain path prediction information of a branch instruction in a branch prediction search process, and therefore does not need to separately access the BTB 102. This further reduces the quantity of times that the BTB 102 is accessed, and helps to reduce the conflict probability of the BTB 102.

Figure 6:
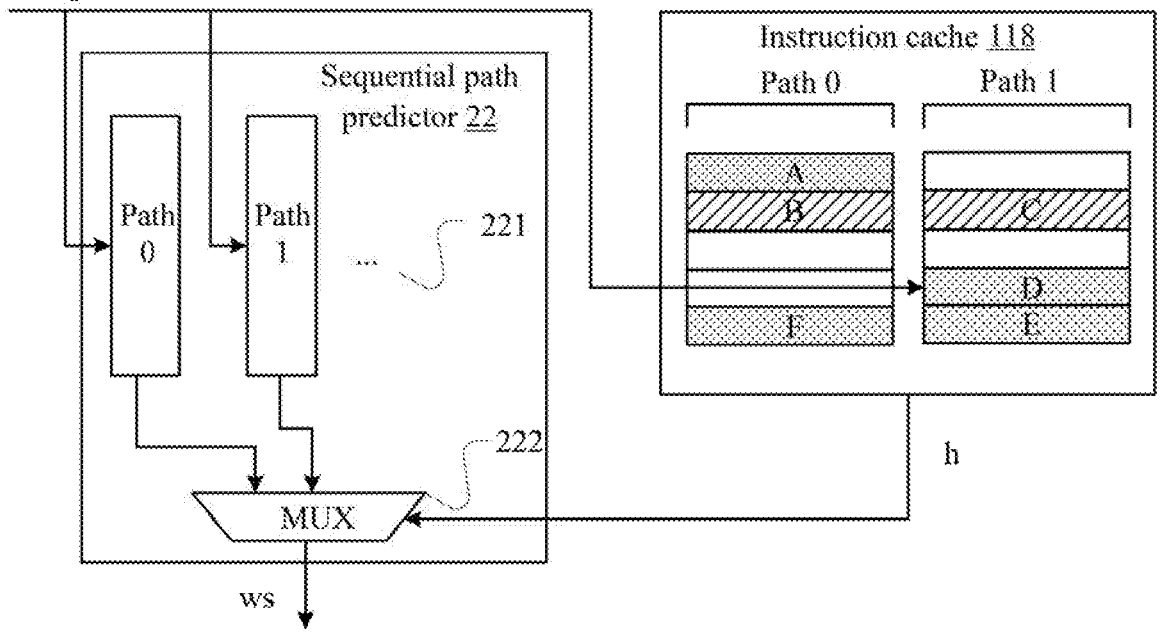
FIG. 6 illustrates a schematic block diagram of a sequential path predictor according to an embodiment of the present invention.

FIG. 6 illustrates a schematic block diagram of a sequential path predictor according to an embodiment of the present invention. A sequential path predictor 22 may be directly used as the path prediction unit 20 shown in FIG. 4, or used as an internal unit of the path prediction unit 20.

The sequential path predictor 22 includes a prediction buffer 221 and a multi-path selector 222, and is configured to perform path prediction for a non-jump instruction, and control path selection of a comparison logic unit 10 in an access control unit 101 based on prediction information.

The prediction buffer 221 is, for example, apart of a level 1 cache L1. A size of the prediction buffer 221 is related to an index value of an instruction cache 118 and a quantity of set associations. For a 32K 2-way set-associative instruction cache with an index of 256 (that is, S=256, E=2, B=64 bytes), the size of the prediction buffer 221 is $2*256*\log_2 2=512$ bits. Each cache line of the instruction cache 118 has a 1-bit prediction value in the prediction buffer 221, and a 1-bit binary number is used as path prediction information, where numeric values 0 and 1 respectively indicate a cache line 0 and a cache line 1.

When an instruction fetch unit 114 obtains an instruction from the instruction cache 118, the access control unit 101 triggers sequential path prediction when an instruction address is located at a cache line boundary (cache line boundary). A tag t and a set index i in an instruction address of a program counter PC may be used to index any cache line in the instruction cache 118, and a block offset o may be used to determine whether the instruction address is located at the cache line boundary. If the block offset o points to a last data block of a current cache line, a next instruction address may be located in another cache line, and therefore cross-cache-line access may occur.

By using the index i in the instruction address as a set index, the sequential path predictor 22 searches for corresponding cache sets of S cache sets in the prediction buffer 221, and obtains path prediction information of E cache lines in the sets. Based on hit information of the currently accessed instruction cache 118, the multi-path selector 222 selects path prediction information w of a corresponding path from a plurality of pieces of path prediction information. Further, when cross-cache-line access occurs, the sequential path predictor generates a path selection signal ws corresponding to the path prediction information w. Further, after it is found during pre-decoding that cross-line access of a non-jump instruction exists in an instruction packet, the comparison logic unit 10 in the access control unit 101 enables only a single data channel based on the path selection signal ws in sequential path prediction. Therefore, about 1/N dynamic power consumption is generated, where N indicates a quantity of cache lines in the instruction cache 118.

In this embodiment, the instruction cache 118 has a 2-way set-associative structure, and an instruction D in an application program is a non-jump instruction. When sequential path prediction is used, the sequential path predictor 22 learns that path prediction information in a BTB 102 is the cache line 0. The access control unit 101 accesses the instruction cache 118 based on an instruction fetch operation of the instruction D, and enables only a comparison logic and a data channel of the cache line 0. Therefore, only about ½ dynamic power consumption is generated.

Figure 7:
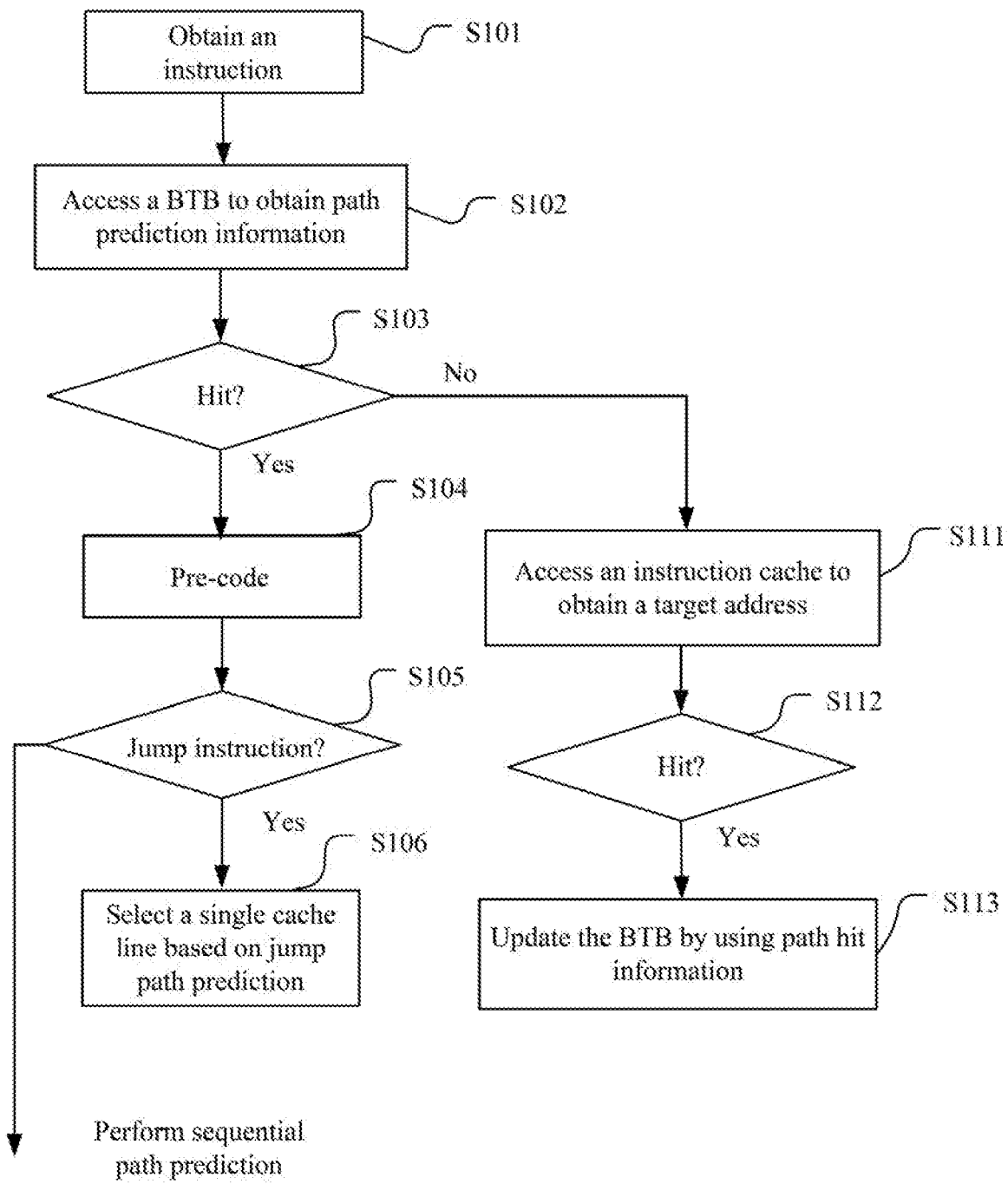
FIG. 7 illustrates a flowchart of a jump path prediction method according to an embodiment of the present invention.

FIG. 7 illustrates a flowchart of a jump path prediction method according to an embodiment of the present invention. In the jump path prediction method, for example, main steps in the jump path predictor 21 shown in FIG. 5 are performed. The application program shown in FIG. 2 is used as an example to describe the jump path prediction method in detail.

As described above, to implement jump path prediction, each entry in a BTB 102 not only includes a branch instruction address b, a target address t, and target prediction statistics information v, but also includes extended path prediction information w and a flag bit.

In step S101, an instruction fetch unit 114 obtains an instruction address of a program counter PC. The instruction address is, for example, a physical address obtained by performing address translation by using a TBL. The instruction address includes a tag t, a set index i, and a block offset o. For example, an instruction B in an application program is a jump instruction.

In step S102, the jump path predictor 21 is coupled to the BTB 102, and searches the BTB 102 based on the instruction address to obtain path prediction information w. For example, a target address of the jump instruction B is an instruction address of an instruction F. In an entry corresponding to the jump instruction B in the BTB 102, path prediction information is 0, which indicates that a data block of the instruction F is located in a cache line 0 of an instruction cache 118.

In step S103, the jump path predictor 21 determines whether any entry in the BTB 102 is hit. If an entry is hit, the jump path predictor 21 obtains path prediction information w of a corresponding entry in the BTB 102 as path prediction information used for path selection, and performs steps S104 to S106 to implement path selection. If no entry is hit, the jump path predictor 21 executes instructions sequentially, and performs steps S111 to S113 to implement path maintenance.

In step S104, an instruction packet is decoded.

In step S105, whether a current instruction is a jump instruction is determined. If the current instruction is a jump instruction, step S106 is performed. If the current instruction is a non-jump instruction, sequential path prediction is performed.

In step S106, the jump path predictor 21 is used to generate a selection signal ws corresponding to the path prediction information w.

After jump path selection is implemented, a comparison logic unit 10 in an access control unit 101 enables only a single channel based on the path selection signal ws in jump path prediction. Therefore, dynamic power consumption in access to the instruction cache 118 can be reduced.

For the search in the BTB 102, there are the following possibilities.

First possibility: The BTB 102 is hit. In this case, the instruction fetch unit 114 obtains the instruction packet from the instruction cache 118 based on the target address found in the BTB 102, and the access control unit 101 enables a single cache line based on the path prediction information w of the jump instruction B.

Second possibility: The BTB 102 is not hit. In this case, the instruction fetch unit 114 executes instructions sequentially, that is, performs the foregoing step S111. An instruction processing apparatus 100 temporarily stores addresses of the jump instruction B and the target instruction F, and accesses the instruction cache 118 in a mode of accessing a plurality of data lines in parallel. In step S112, the comparison logic unit 10 in the access control unit 101 determines whether the jump instruction B and the target instruction F hit the instruction cache 118. When the jump instruction B and the target instruction F hit the instruction cache 118, step S113 is performed. A path maintenance unit 30 of the access control unit 101 records path hit information of the target instruction F when accessing a plurality of data lines in parallel, so that the instruction address b of the jump instruction B, the instruction address t of the target instruction F, and the path hit information (used as path prediction information w) are written as a new entry to the BTB 102. Therefore, path maintenance of jump path prediction is implemented by updating the BTB 102.

In the jump path prediction method according to this embodiment, entries of the BTB 102 include extended path prediction information. When the jump instruction B hits the BTB 102, the access control unit 101 may not only implement branch prediction of the jump instruction B to obtain the target address, but also implement jump path prediction of the jump instruction B and enable access to a single cache line based on the path prediction information. Therefore dynamic power consumption in access to the instruction cache 118 can be reduced. When the jump instruction B does not hit the BTB 102, the access control unit 101 executes instructions sequentially, and temporarily stores the instruction addresses of the jump instruction B and the target instruction F, and the path hit information of the target instruction F, and adds a new entry to the BTB 102, to implement path maintenance of jump path prediction.

In path maintenance of jump path prediction, a mode of temporarily storing the information and performing deferred write-back can reduce a conflict probability of the BTB 102. When no jump instruction hits the BTB, a NOP occurs in one or more periods in an instruction stream of the instruction processing apparatus 100. In a preferred embodiment, after the information is temporarily stored, write-back is performed only when no jump instruction hits the BTB next time. Therefore, path maintenance of jump path prediction is performed during a NOP, to reduce adverse impact of path maintenance of path prediction on performance of the instruction processing apparatus.

Figure 8:
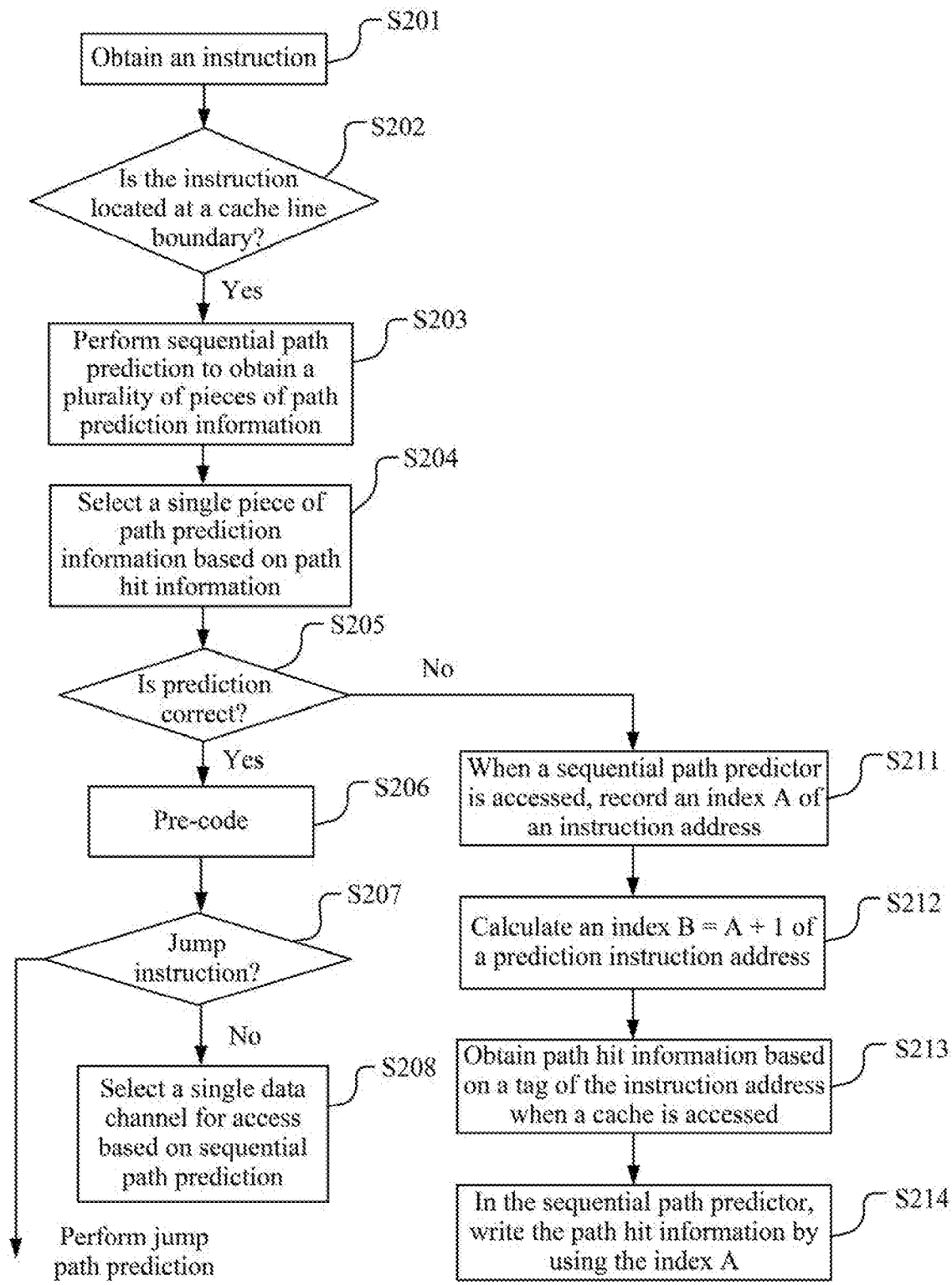
FIG. 8 illustrates a flowchart of a sequential path prediction method according to an embodiment of the present invention.

FIG. 8 illustrates a flowchart of a sequential path prediction method according to an embodiment of the present invention. In the sequential path prediction method, for example, main steps in the sequential path predictor 22 shown in FIG. 6 are performed. The application program shown in FIG. 2 is used as an example to describe the sequential path prediction method in detail.

As described above, to implement sequential path prediction, the sequential path predictor 22 includes a prediction buffer 221 and a multi-path selector 222, and is configured to perform path prediction for a non-jump instruction, and control path selection of a comparison logic unit 10 in an access control unit 101 based on prediction information.

The following uses a 32K 2-way set-associative instruction cache with an index of 256 (that is, S=256, E=2, B=32 bytes) as an example to describe the sequential path prediction method in this embodiment. However, a cache set, cache line, or cache block of a specific size is not limited in the present invention.

Each cache line of the instruction cache 118 has a $\log_2$ N-bit prediction value in the prediction buffer 221, where N indicates a quantity of cache lines of the instruction cache 118. For example, when the instruction cache 118 has a 2-way set-associative structure, each cache line of the instruction cache 118 uses a 1-bit binary number as path prediction information.

In step S201, an instruction fetch unit 114 obtains an instruction address of a program counter PC. The instruction address is, for example, a physical address obtained by performing address translation by using a TBL. The instruction address includes a tag t, a set index i, and a block offset o. For example, an instruction D in an application program is a non-jump instruction.

In step S202, the sequential path predictor 22 determines, based on the instruction address, whether the instruction is located at a cache line boundary. If the instruction address is located at the cache line boundary, step S203 is performed.

In this step, as described above, whether the instruction address is located at the cache line boundary may be determined based on the block offset o of the instruction address. If the block offset o points to a last data block of a current cache line, a next instruction address may be located in another cache line, and therefore cross-cache-line access may occur.

In step S203, the index i in the instruction address is used as a set index to search for two pieces of path prediction information of two cache lines in a cache set i in 256 cache sets in the prediction buffer 221.

In step S204, the multi-path selector 222 selects path prediction information w of a corresponding path from the two pieces of path prediction information based on hit information of the instruction D in the cache 118 that is currently being accessed.

In step S205, the comparison logic unit 10 in the access control unit 101 determines whether the path prediction information w is correct. If the path prediction information w is correct, the path prediction information w is used for path selection, and steps S206 to S208 are performed. If the path prediction information w is incorrect, steps S211 to S214 are performed to implement path maintenance.

When the access control unit 101 uses the sequential path predictor 22 to enable a single data channel of the instruction cache 118, the comparison logic unit 10 in the access control unit 101 still enables all comparison logical channels. Therefore, the comparison logic unit 10 compares the tag t of the instruction address with a tag t of a hit cache line in the cache 118, and may determine, based on a comparison result, whether the path prediction information w is correct.

In step S206, the instruction D is decoded.

In step S207, whether the instruction D is a jump instruction is determined. If the instruction D is a non-jump instruction, step S208 is performed. If the instruction D is a jump instruction, jump path prediction is performed.

In step S208, the sequential path predictor 22 is used to generate a selection signal ws corresponding to the path prediction information w. If a set index of a next instruction address is i+1, cross-cache-line access occurs. The comparison logic unit 10 in the access control unit 101 enables only a single data channel based on the path selection signal ws of sequential path prediction, to implement sequential path selection.

In the sequential path prediction method according to this embodiment, sequential path prediction is triggered when the current instruction D is located at the cache line boundary; not only the path prediction information is selected based on the path hit information of the current instruction D, but also whether the prediction is correct is determined based on all comparison logical channels enabled when a next instruction E accesses the instruction cache 118. If the path prediction information w is incorrect, steps S211 to S214 are performed to implement path maintenance.

In step S211, when the current instruction D accesses the sequential path predictor 22, an index A used in access is recorded.

In step S212, because the instruction D is a non-jump instruction, if cross-cache-line access occurs, an index B=A+1 of the next instruction E is calculated.

In step S213, path selection is performed by using the path prediction information w provided by the sequential path predictor 22; and the comparison logic unit 10 in the access control unit 101 compares tags t of all cache lines to obtain path hit information of the next instruction E in the instruction cache 118.

In step S214, if the path hit information is inconsistent with the path prediction information, in the prediction buffer 221 of the sequential path predictor 22, the path hit information is written by using the index A, as new path prediction information.

In this embodiment, the instruction cache 118 has a 2-way set-associative structure, and the instruction D in the application program is a non-jump instruction. After it is found during pre-decoding that cross-line access of the non-jump instruction E exists in the instruction packet, the comparison logic unit 10 in the access control unit 101 enables only a single data channel based on the path selection signal ws in sequential path prediction. Therefore, about 1/N dynamic power consumption is generated, where N indicates a quantity of cache lines in the instruction cache 118.

Figure 9:
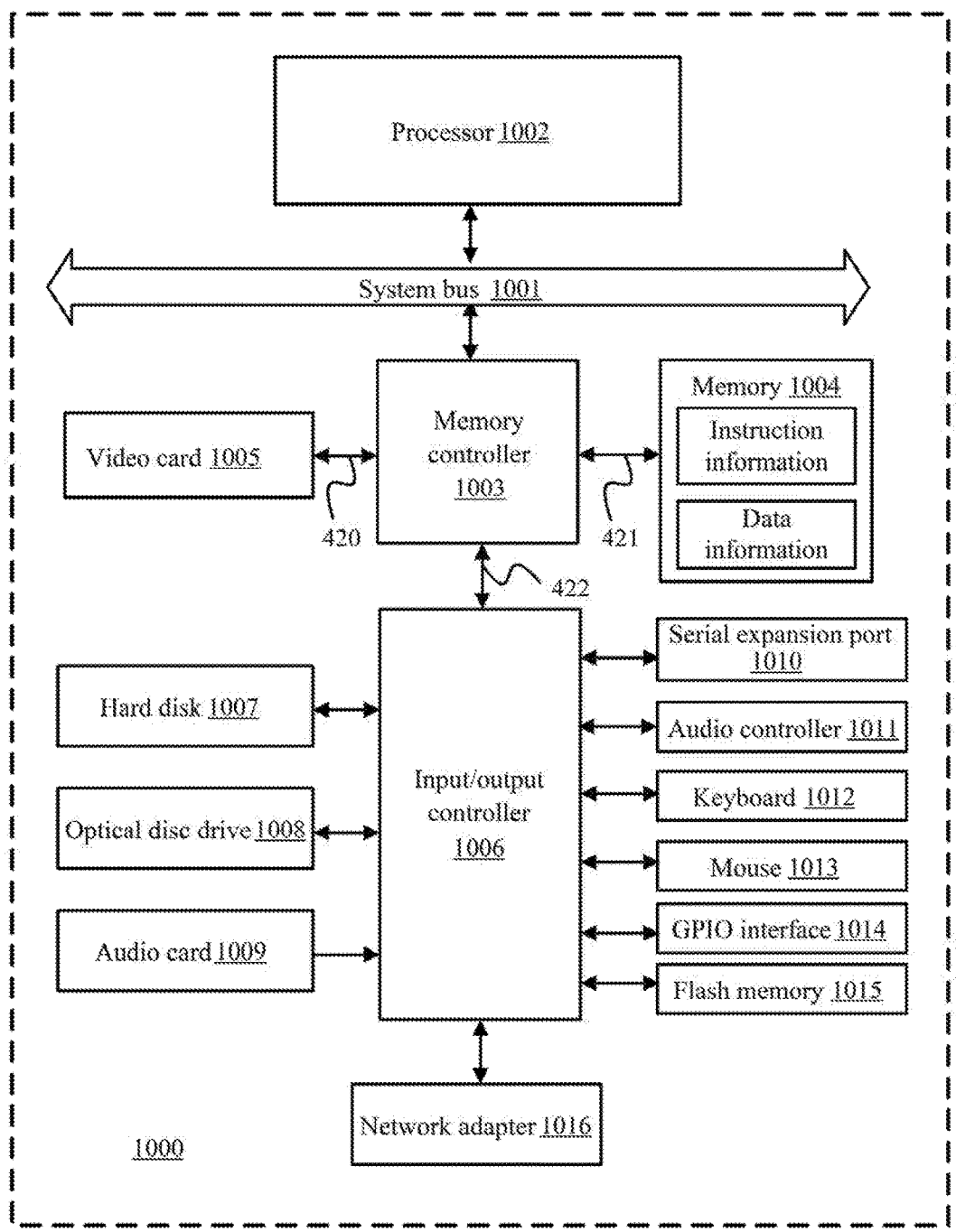
FIG. 9 illustrates a schematic structural diagram of a computer system according to an embodiment of the present invention.

FIG. 9 illustrates a schematic structural diagram of a computer system according to an embodiment of the present invention.

The computer system 1000 is an example of a "central" system architecture. The computer system 1000 may be constructed based on processors of various models in a current market, and driven by an operating system such as a WINDOWS™ operating system version, a UNIX operating system, or a Linux operating system. In addition, the computer system 1000 is generally implemented in a PC computer, a desktop computer, a notebook, or a server.

As shown in FIG. 9, the computer system 1000 includes a processor 1002. The processor 1002 has a data processing capability well known in the art. The processor may be a processor with a complex instruction set computing (CISC) architecture, a reduced instruction set computing (RISC) architecture, or a very long instruction word (VLIW) architecture, or is a processor implementing a combination of the instruction sets, or is a processor device constructed for a special purpose.

The processor 1002 is coupled to a system bus 1001, and the system bus 1001 may transmit a data signal between the processor 1002 and another unit.

The computer system 1000 further includes a memory 1004 and a video card 1005. The memory 1004 may be a dynamic random access memory (DRAM) device, a static random access memory (SRAM) device, a flash memory device, or another memory device. The memory 1004 may store instruction information and/or data information indicated by a data signal. The video card 1005 includes a display driver, configured to control correct displaying of a display signal on a display screen.

The video card 1005 and the memory 1004 are coupled to the system bus 1001 by a memory controller 1003. The processor 1002 may communicate with the memory controller 1003 by using the system bus 1001. The memory controller 1003 provides a high-bandwidth memory access path 421 to the memory 1004, for storing and reading instruction information and data information. In addition, the memory controller 1003 and the video card 1005 transmit a display signal based on a video card signal input/output interface 420. For example, the video card signal input/output interface 420 is of a DVI or HDMI interface type.

The memory controller 1003 not only transmits digital signals between the processor 1002, the memory 1004, and the video card 1005, but also bridges digital signals between the system bus 1001 and the memory 1004 and an input/output controller 1006.

The computer system 1000 further includes the input/output controller 1006, which is coupled to the memory controller 1003 by using a dedicated hub interface bus 422, and couples some I/O devices to the input/output controller 1006 by using a local I/O bus. The local I/O bus is configured to couple a peripheral device to the input/output controller 1006, and further couple the peripheral device to the memory controller 1003 and the system bus 1001. The peripheral device includes but is not limited to the following devices: a hard disk 1007, an optical disc drive 1008, an audio card 1009, a serial expansion port 1010, an audio controller 1011, a keyboard 1012, a mouse 1013, a GPIO interface 1014, a flash memory 1015, and a network adapter 1016.

Certainly, structural diagrams of different computer systems also vary depending on different mother boards, operating systems, and instruction set architectures. For example, currently, in many computer systems, the memory controller 1003 is integrated in the processor 1002. Therefore, the input/output controller 1006 becomes a control center coupled to the processor 1002.

Figure 10:
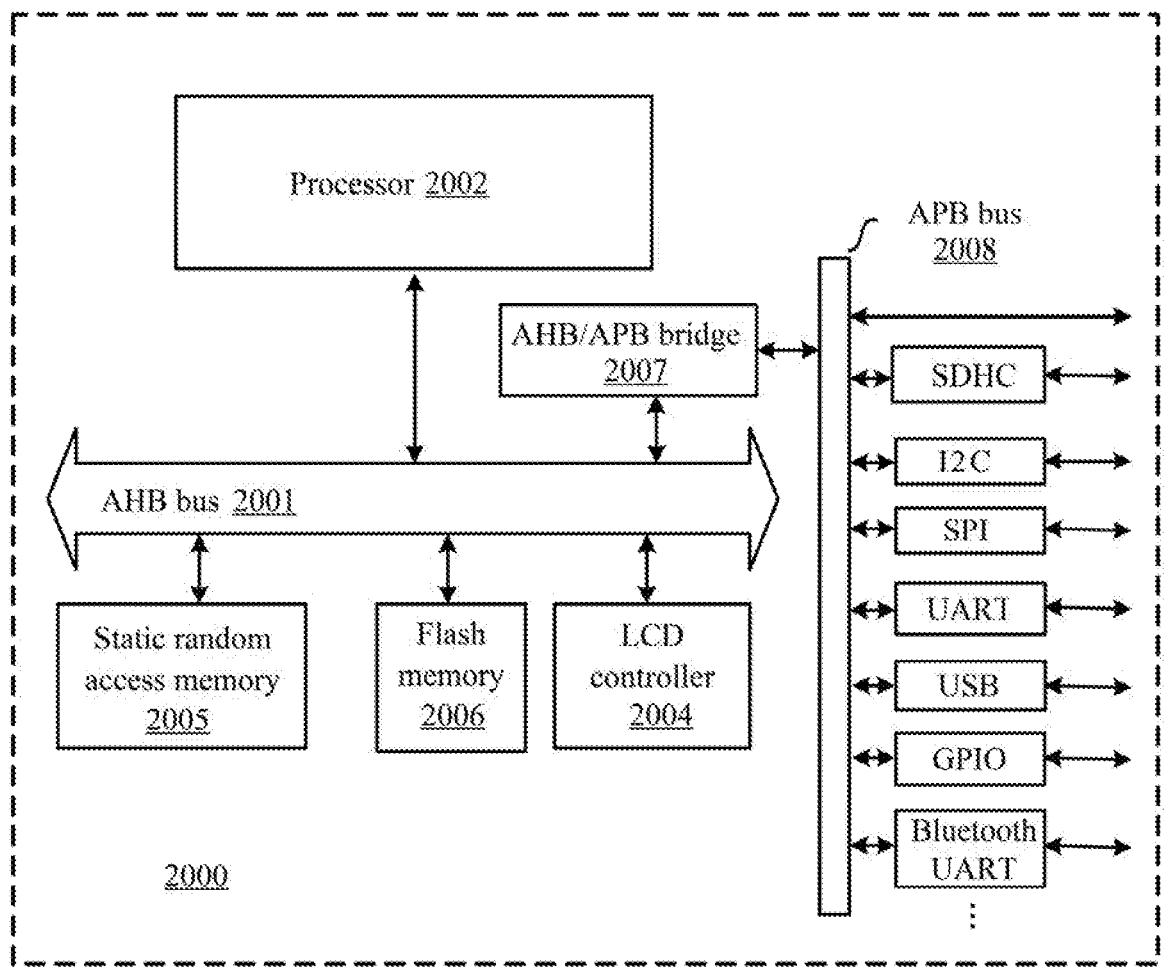
FIG. 10 illustrates a schematic structural diagram of a system-on-chip according to an embodiment of the present invention.

FIG. 10 illustrates a schematic structural diagram of a system-on-chip according to an embodiment of the present invention.

A system-on-chip 2000 is a complete system integrated with a single chip, and may be produced and sold as an independent component, or may be combined with another component to form a new component for production and sale.

The system-on-chip 2000 may be produced by using a plurality of models of processors in a current market, and may be driven by an operating system such as WINDOWS™, UNIX, Linux and Android, or RTOS. The system-on-chip 2000 may be implemented in a computer device, a handheld device, and an embedded product. Some examples of the handheld device include a cellular phone, an Internet device, a digital camera, a personal digital assistant (PDA), and a handheld PC. The embedded product may include a network computer (NetPC), a set top box, a network hub, a wide area network (WAN) switch, or another system that may execute one or more instructions.

As shown in FIG. 10, the system-on-chip 2000 includes a processor 2002 coupled by an AHB (Advanced High performance Bus, system bus) bus 2001, a static random access memory 2005, an LCD controller 2004, a flash memory 2006, and an AHB/APB bridge 2007.

The processor 2002 may be a complex instruction set computing (CSC) microprocessor, a reduced instruction set computing (RISC) microprocessor, a very long instruction word (VLIW) microprocessor, a processor implementing a combination of the instruction sets, or any one of other processor devices. The processor 2002 further includes a processor core that is improved based on the technical solutions provided by the embodiments of the present disclosure. Details thereof are provided hereinafter.

The static random access memory 2005 and the flash memory 2006 are configured to store instruction information and/or data information indicated by a data signal. For example, the static random access memory 2005 may be used as a runspace for various application programs, create stacks for various application programs, store intermediate data, and the like. The flash memory 2006 may store executable codes of various application programs and executable codes of an operating system.

The AHB bus 2001 is configured to transmit a digital signal between high performance modules of the system-on-chip 2000, for example, transmit a digital signal between the processor 2002 and the static random access memory 2005, between the processor 2002 and the LCD controller 2004, between the processor 2002 and the flash memory 2006, or between the processor 2002 and the AHB/APB bridge 2007.

The AHB/APB bridge 2007 is configured to bridge data transmission between the AHB bus and the APB bus, lock an address, data, and a control signal from the AHB bus, and provide level 2 decoding to generate a selection signal of an APB peripheral device, to implement conversion from the AHB protocol to the APB protocol.

The system-on-chip 2000 may further include various interfaces coupled to the APB bus. Various interfaces include but are not limited to the following types of interfaces: SD high capacity storage card (SDHC, Secure Digital High Capacity), I2C bus, serial peripheral interface (SPI, Serial Peripheral Interface), universal asynchronous receiver/transmitter (UART, Universal Asynchronous Receiver/Transmitter), universal serial bus (USB, Universal Serial Bus), general-purpose input/output (GPIO, General-purpose input/output), and Bluetooth UART. The peripheral device coupled to the interface is, for example, a USB device, a storage card, a packet receiver/transmitter, or a Bluetooth device.

As design complexity of the system-on-chip increases and a processing capability of the processor is improved continuously, performance limitations of the bus structure cause the bus structure to be updated and replaced. For example, ARM has launched a higher performance AXI (Advanced eXtensible Interface) on a basis of the AHB bus. Therefore, the AXI bus may be used to replace the AHB bus 2001 in the figure. In addition, research and development personnel in the art may also improve an existing bus architecture based on an actual requirement or construct a new bus structure. Therefore, although the AHB bus is illustrated in the figure, actually, a variety of buses may be selected for the SoC.

In conclusion, a core of this embodiment of the present disclosure lies in providing an instruction processing apparatus implemented with low power consumption. The instruction processing apparatus selectively enables an access channel of an instruction cache based on path prediction information by using an access control unit, to reduce dynamic power consumption in access. The instruction processing apparatus is especially applicable to a plurality of scenarios with high power consumption sensitivity, for example, a scenario in which a large-capacity battery cannot be used for a sensor in a human body, or for another example, used as a micro control unit (MCU) and applied to a face scanner, a fingerprint reader, a remote control, or a household device IoT product. In the scenarios, power consumption is limited by both a product size and product cost. For a manufacturer, reduction of power consumption may break the limitations of a battery size and battery cost, and may further bring related products to a new potential market; in addition, reduction of power consumption can also make performance of an existing product more advantageous, to further expand the market and obtain economic benefits.

However, in some cases, a scenario with high power consumption sensitivity and a scenario with low power consumption sensitivity may alternately occur in an instruction processing apparatus. For example, if the instruction processing apparatus has an energy obtaining technology, energy can be obtained from outside in a condition and provided to the instruction processing apparatus. Therefore, when energy is sufficient, the instruction processing apparatus may enable a plurality of access channels of the instruction cache, and obtain instructions from the plurality of access channels at the same time to ensure that the instructions are obtained in a single attempt. When energy is insufficient, the instruction processing apparatus may selectively enable an access channel of the instruction cache to obtain an instruction, to reduce dynamic power consumption in access. The following describes a variation of this embodiment on a basis of FIG. 1. As shown in FIG. 1, the access control unit 101 is coupled to a detection unit (not shown), where the detection unit is configured to detect battery energy in a system; and when the battery energy is less than a critical point, send an enable signal to the access control unit 101, so that the access control unit 101 enables the path prediction unit, to reduce dynamic power consumption in access; or when the battery energy is greater than or equal to a critical point, send a stop signal to the access control unit 101, so that the access control unit 101 disables the path prediction unit, to ensure that instructions are obtained in a single attempt.

For the present invention, the processing unit, the processing system, and the electronic device may be implemented in hardware, or a dedicated circuit, software, logic, or any combination thereof. For example, some aspects may be implemented in hardware, and other aspects may be implemented in a controller, a microprocessor, or firmware or software executed by another computing device, although the present invention is not limited thereto. Although each aspect of the present invention may be described as a block diagram or a flowchart, or described by using other graphs, it is well understood that, as a nonrestrictive example, the block, apparatus, system, technology, or method described in this specification may be implemented by using hardware, software, firmware, a dedicated circuit or logic, general-purpose hardware, or a controller, or another computing device, or a combination thereof. If required, a circuit design of the present invention may be implemented in each component of an integrated circuit module or the like.

The foregoing are only preferred embodiments of the present invention, and not intended to limit the present invention. For those skilled in the art, the present invention may be subject to various modifications and variations. Any modification, equivalent replacement, improvement, and the like within the spirit and principle of the present invention shall fall within the protection scope of the present invention.

What is claimed is:

1. An instruction processing apparatus, comprising:
an instruction fetch unit, adapted to obtain an instruction based on an instruction address of a program counter;
an execution unit, coupled to the instruction fetch unit, and adapted to execute the instruction;
an instruction cache, adapted to store instruction content accessed by using the instruction address, wherein the instruction cache maps data blocks in a memory based on a multi-way set-associative structure and comprises a plurality of cache lines; and an access control unit, coupled between the instruction fetch unit and the instruction cache, and adapted to read the plurality of cache lines respectively by using a plurality of data channels, and select a cache line from the plurality of cache lines by using a plurality of selection channels, to obtain the instruction, wherein the access control unit comprises a path prediction unit, wherein the path prediction unit is enabled based on a signal indicating that energy in the instruction processing apparatus is below a critical point, and wherein the path prediction unit is adapted to:

determine a type of the instruction, obtain, based on the determined type of the instruction, path prediction information corresponding to the instruction address, and enable at least one data channel and/or at least one selection channel based on the path prediction information.

2. The instruction processing apparatus according to claim 1, wherein the path prediction unit comprises a jump path predictor, and wherein when the type of the instruction is a jump instruction, the jump path predictor obtains path prediction information of the jump instruction.

3. The instruction processing apparatus according to claim 2, further comprising:

a branch target buffer, coupled between the instruction fetch unit and the access control unit, and comprising a mapping table adapted to store a branch instruction address, a target address, and the path prediction information as entry content, wherein the path prediction information indicates a cache line in which a target address of the jump instruction is located, in the plurality of cache lines in the instruction cache, wherein the jump path predictor uses an instruction address of the jump instruction as an index to search for the branch instruction address in the branch target buffer, to obtain the path prediction information of the jump instruction.

4. The instruction processing apparatus according to claim 3, wherein the path prediction information is a path sequence number of the target address of the jump instruction in the plurality of cache lines in the instruction cache.

5. The instruction processing apparatus according to claim 3, wherein the access control unit further comprises a path maintenance unit, and wherein when the instruction address of the jump instruction does not hit the branch target buffer, the access control unit is adapted to:

enable a plurality of data channels and the plurality of selection channels; and read the plurality of cache lines in parallel to obtain the target address and path hit information of the jump instruction; and wherein the path maintenance unit is adapted to:

add an entry to the branch target buffer by using the jump instruction, the target address, and the path hit information, to perform path maintenance.

6. The instruction processing apparatus according to claim 5, wherein the path maintenance unit is further adapted to:

temporarily store the jump instruction, the target address, and the path hit information; and during an instruction stream NOP of the jump instruction after the jump instruction does not hit the branch target butter, perform the path maintenance.

7. The instruction processing apparatus according to claim 1, wherein the path prediction unit comprises a sequential path predictor, and wherein when the type of the instruction is a non-jump instruction, the sequential path predictor obtains path prediction information of the non-jump instruction.

8. The instruction processing apparatus according to claim 7, wherein the instruction address comprises a tag, a set index, and a block offset, and wherein the tag and the set index are used to index a single cache line in the plurality of cache lines.

9. The instruction processing apparatus according to claim 8, wherein the sequential path predictor comprises:

a prediction buffer, adapted to store path prediction information of each cache line in the instruction cache, wherein when the non-jump instruction is located at a cache line boundary, the prediction buffer obtains a plurality of pieces of the path prediction information based on the set index in the instruction address of the non-jump instruction; and a multi-path selector, coupled to the prediction buffer, and adapted to select a single piece of the path prediction information from the plurality of pieces of the path prediction information based on path hit information of the non-jump instruction, to enable at least one data channel when a non-jump instruction next to the non-jump instruction crosses cache lines, wherein the sequential path predictor uses the set index in the instruction address of the non-jump instruction as an index to search for the plurality of pieces of the path prediction information corresponding to the non-jump instruction in the prediction buffer.

10. The instruction processing apparatus according to claim 9, wherein whether the non-jump instruction is located at the cache line boundary is determined based on a relationship between the block offset of the instruction address of the non-jump instruction and a data block of a corresponding cache line in the plurality of cache lines.

11. The instruction processing apparatus according to claim 9, wherein when the at least one data channel is enabled, the sequential path predictor enables the plurality of selection channels.

12. The instruction processing apparatus according to claim 9, wherein a size of the prediction buffer is $N*S*\log_2 N$ bits, wherein S indicates a set quantity of the plurality of cache lines and N indicates a path quantity of the plurality of cache lines, and wherein S and N are integers.

13. The instruction processing apparatus according to claim 12, wherein the path prediction information is a path sequence number of the non-jump instruction in the plurality of cache lines in the instruction cache.

14. The instruction processing apparatus according to claim 11, wherein the access control unit further comprises a path maintenance unit, and wherein after the sequential path predictor selects the single piece of the path prediction information to enable the at least one data channel, the access control unit is adapted to:

in a plurality of logical channels, compare the tag of the instruction address with tags of the plurality of cache lines; and wherein the path maintenance unit is adapted to:

determine, based on comparison results of the plurality of logical channels, whether the selected single piece of the path prediction information is correct; and if the selected single piece of the path prediction information is incorrect, update the prediction buffer based on path hit information of a next non-jump instruction of the cache line, to implement path maintenance.

15. A computer system, comprising an instruction processing apparatus, wherein the instruction processing apparatus comprises:
an instruction fetch unit, adapted to obtain an instruction based on an instruction address of a program counter;
an execution unit, coupled to the instruction fetch unit, and adapted to execute the instruction;
an instruction cache, adapted to store instruction content accessed by using the instruction address, wherein the instruction cache maps data blocks in a memory based on a multi-way set-associative structure and comprises a plurality of cache lines; and
an access control unit, coupled between the instruction fetch unit and the instruction cache, and adapted to read the plurality of cache lines respectively by using a plurality of data channels, and select a cache line from the plurality of cache lines by using a plurality of selection channels, to obtain the instruction, wherein the access control unit comprises a path prediction unit, wherein the path prediction unit is enabled based on a signal indicating that energy in the instruction processing apparatus is below a critical point, and wherein the path prediction unit is adapted to:
determine a type of the instruction,
obtain, based on the determined type of the instruction, path prediction information corresponding to the instruction address, and
enable at least one data channel and/or at least one selection channel based on the path prediction information.

16. The instruction processing apparatus according to claim 1, wherein the instruction processing apparatus is comprised in a system-on-chip.

17. A path prediction method used for an instruction cache, wherein the instruction cache is adapted to store instruction content accessed by using an instruction address and map data blocks in a memory based on a multi-way set-associative structure, and comprises a plurality of cache lines, and wherein the path prediction method comprises:
obtaining an instruction based on an instruction address of a program counter;
determining a type of the instruction,
obtaining, based on the determined type of the instruction, path prediction information corresponding to the instruction address;
enabling at least one data channel in a plurality of data channels and/or at least one selection channel in a plurality of selection channels based on the path prediction information, wherein the at least one data channel and/or at least one selection channel is enabled based on a signal indicating that energy in an instruction processing apparatus is below a critical point; and
selecting, from the plurality of cache lines by using the instruction address as an index, a cache line corresponding to the instruction address, to obtain the instruction.

18. The path prediction method according to claim 17, further comprising: when the type of the instruction is a jump instruction, obtaining the path prediction information of the jump instruction.

19. The path prediction method according to claim 18, further comprising:
storing the path prediction information of the jump instruction by using a branch target buffer, wherein the branch target buffer includes a mapping table adapted to store a branch instruction address, a target address, and the path prediction information as entry content, wherein the path prediction information indicates a cache line in which a target address of the jump instruction is located, in the plurality of cache lines in the instruction cache, wherein
obtaining the path prediction information of the jump instruction comprises: using the instruction address of the jump instruction as an index to search for the branch instruction address in the branch target buffer, to obtain the path prediction information corresponding to the jump instruction.

20. The path prediction method according to claim 19, wherein the path prediction information is a path sequence number of the target address of the jump instruction in the plurality of cache lines in the instruction cache.

* * * * *